(No Model.) 5 Sheets—Sheet 1.
D. M. HARTMAN & J. G. DONNELL.
MACHINE FOR STACKING CAKES.
No. 571,663. Patented Nov. 17, 1896.
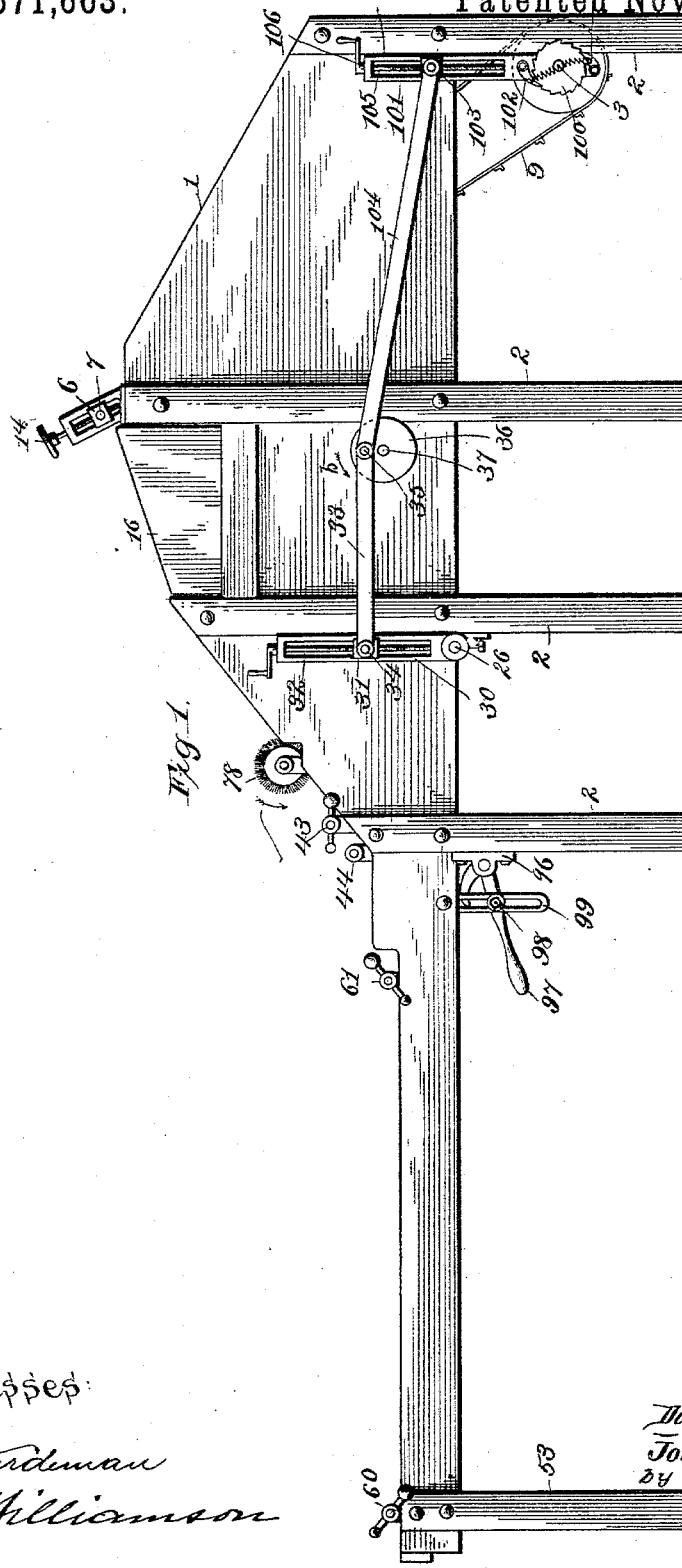
Witnesses:
E. C. Wurdeman
J. F. Williamson
Inventors
Daniel M. Hartman
John G. Donnell
by Geo. H. Holgate
Attorney

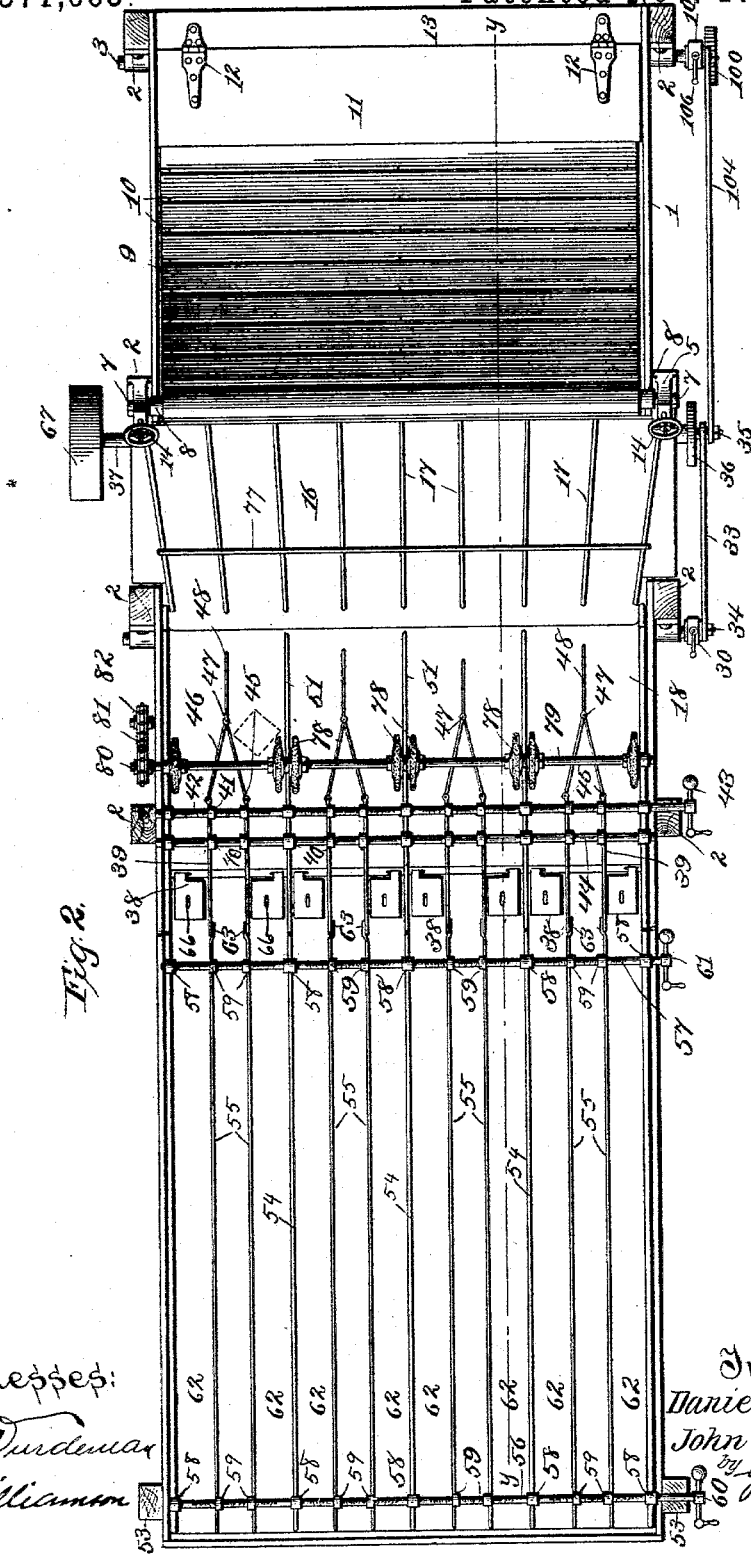

(No Model.) 5 Sheets—Sheet 3.
D. M. HARTMAN & J. G. DONNELL.
MACHINE FOR STACKING CAKES.
No. 571,663. Patented Nov. 17, 1896.
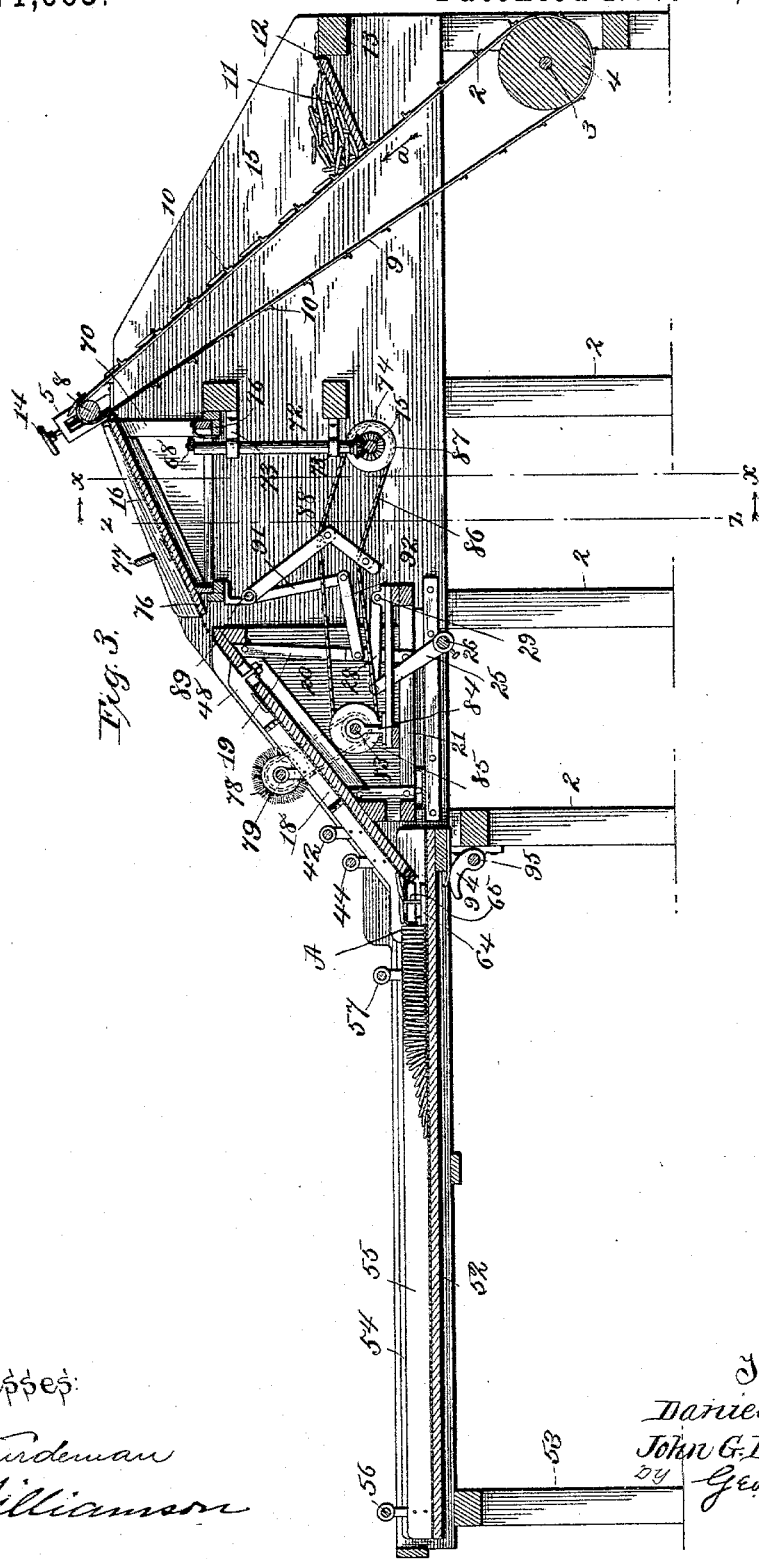
Witnesses:
E. C. Wurdeman
J. J. Williamson
Inventors
Daniel M. Hartman
John G. Donnell
by Geo. H. Holgate
Attorney (No Model.) 5 Sheets—Sheet 4.
D. M. HARTMAN & J. G. DONNELL.
MACHINE FOR STACKING CAKES.
No. 571,663. Patented Nov. 17, 1896.
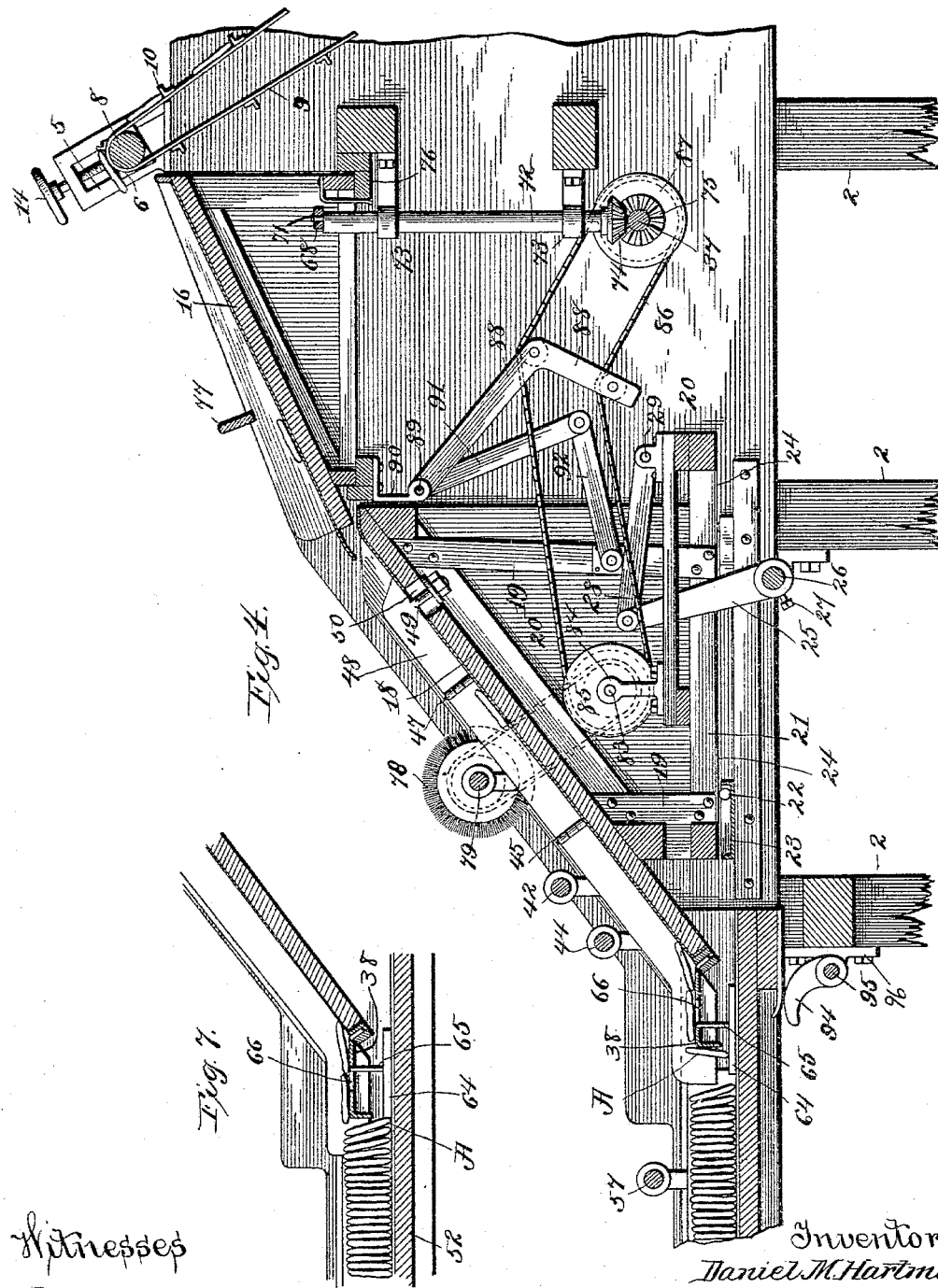
Witnesses
Inventors
Daniel M. Hartman
John G. Donnell
by Geo. Holgate
Attorney

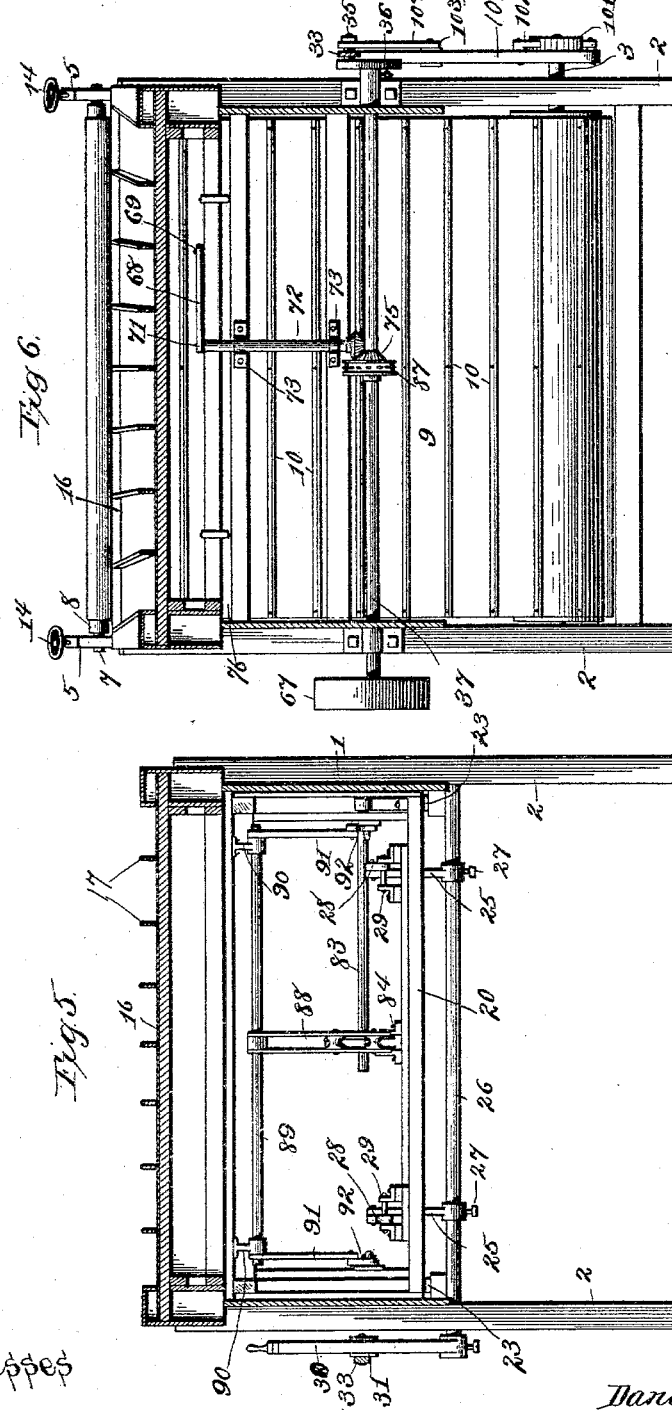

UNITED STATES PATENT OFFICE.

DANIEL MAURICE HARTMAN AND JOHN G. DONNELL, OF PHILADELPHIA, PENNSYLVANIA.

MACHINE FOR STACKING CAKES.

SPECIFICATION forming part of Letters Patent No. 571,663, dated November 17, 1896.

Application filed May 29, 1896. Serial No. 593,633. (No model.)

*To all whom it may concern:*

Be it known that we, DANIEL MAURICE HARTMAN and JOHN G. DONNELL, citizens of the United States, residing at Philadelphia, in the county of Philadelphia and State of Pennsylvania, have invented certain new and useful Improvements in Machines for Stacking Cakes, of which the following is a specification.

Our invention relates to a new and useful improvement in machines for stacking cakes and the like prior to the boxing thereof, and has for its object to provide a machine of this description, which will automatically assort, convey, arrange, and discharge cakes which have been placed within the hopper thereof, so that they may be readily removed from the discharge end of the machine for the purpose of packing in suitable boxes or other receptacles.

With these ends in view our invention consists in the details of construction and combination of elements hereinafter set forth, and then specifically designated by the claims.

In order that those skilled in the art to which this invention appertains may understand how to make and use the same, we will describe its construction and operation in detail, referring by numbers to the accompanying drawings, forming a part of this specification, and in which—

Figure 1 is a side elevation of our improved machine; Fig. 2, a plan view thereof; Fig. 3, a section at the line *y y* of Fig. 2; Fig. 4, a similar view showing the parts in a different position; Fig. 5, a cross-section at the line *z z* of Fig. 3; Fig. 6, a section at the line *x x* of the same figure, looking in the direction of the arrow; and Fig. 7, a detail of the stacking and push-out mechanism, illustrating its operation upon the cakes during the first portion of its forward movement.

Referring to these drawings in detail, 1 represents the frame of the machine, which may be of any design, adapted to support the several operating parts thereof, and this frame is supported by the uprights or legs 2. Journaled within suitable boxes secured upon the rear uprights is a shaft 3, carrying a roll 4, and projecting upward from the upper portion of the frame are housings 5, having arranged therein boxes 6, in which is journaled the shaft 7. This shaft also carries a roll 8, and over this roll and the roll 4 travels an endless belt 9. 10 are lags secured crosswise of the belt 9, so that when the latter travels in the direction indicated by the arrow *a* these lags will move upward upon the upper surface of the belt. A board 11 is hinged at 12 to the cross-bar 13 of the frame, so that its inner end projects within the line of travel of the lags in order that when the belt is in motion this board will be vibrated by the lags successively coming in contact therewith, as will be readily understood. The boxes 6 are made adjustable by the threaded rods 14 passing therethrough, the object of which is to adjust the roll 8 relative to the roll 4 to maintain the belt 9 sufficiently taut to cause it to perform its functions.

The sides 15 of the frame and the board 11, taken in conjunction with that portion of the belt which lies above said board, form a hopper, into which the cakes to be manipulated are placed, and it will be seen that when the belt is traveling, as before described, these cakes will be caught by the lags 10 and elevated until passing over the roll 8, when they will be dropped upon the primary chute 16. This chute is inclosed at its sides and is subdivided by the partitions or strips 17, in order that when the cakes are dropped thereon they will be caused to slide down the incline thereof in tiers, which will prevent their clogging, and also serves to guide them to the proper portions of the secondary chute next described.

18 designates the secondary chute, the inclination of which is greater than that of the primary chute, and it consists of a surface supported upon the uprights 19, the latter forming a part of the reciprocating frame 20, which is also composed of the longitudinal bars 21, and this entire frame is adapted to slide to and fro longitudinally by resting upon the balls 22, housed in the boxes 23, and in practice we prefer to protect the under side of the bars 21 against wear by placing thereon the strips 24 against which the balls bear. This arrangement serves to reduce the friction between the reciprocating frame and the stationary frame.

Motion is imparted to the reciprocating frame by the arms 25, which are two in number and secured to the rock-shaft 26 by suitable set-screws 27. The connection between the arms 25 and the reciprocating frame is through the links 28, pivoted to the upper ends of said arms and to said frame at 29.

In order that the rock-shaft may be given an oscillatory movement, the lever 30 is secured to one end thereof outside of the stationary frame, and this lever is slotted and has arranged within said slot a shoe 31, the position of which is determined by the threaded rod 32 passing therethrough, and 33 is a connecting-rod pivoted at 34 to the shoe and at 35 to a crank-wheel 36, secured upon the main shaft 37 of the machine, so that when the main shaft is revolved in the direction of the arrow $b$, a to-and-fro movement will be given to the connecting-rod, which will be imparted to the lever 30 for the purpose just described. The arc through which the lever is oscillated may be varied by the adjustment of the shoe within the slot thereof by the proper manipulation of the rod 33, and this adjustment will vary the throw of the arm 25, thus determining the amount of longitudinal movement of the frame 20 for the purpose hereinafter set forth.

Secured to the lower end of the secondary chute and projecting therefrom in a horizontal plane are a series of platforms 38 upon which the cakes slide in passing from the secondary chute, and these platforms are so arranged relative to said chute as to fall in line with the ways formed thereon by means of the adjustable partitions 39.

The partitions 39 are provided with collars 40 and nuts 41, which latter are threaded upon the rod 42, said rod being provided with a series of right-and-left threads, so that when it is turned through the medium of the handle 43 each pair of said nuts will be caused to approach to or recede from each other, as the case may be, thereby carrying the partitions 39 closer together or farther apart. The collars 40 are supported by the rod 44, which serves to hold the partitions 39 in parallelism, and to these partitions at 45 are pivoted the wings 46, which are pivoted together in pairs at 47, in order that when the partitions are moved toward or from each other the wings will accommodate themselves thereto, the vertex of each pair always remaining in the same longitudinal line.

48 are sliding partitions pivoted at 47 to the wings 46, and each of these sliding partitions has a bolt 49 depending therefrom through a slot 50, formed in the secondary chute, and said bolt is provided with a suitable washer and nut to prevent its withdrawal from the slot, so that when the vertices of the wings move longitudinally by reason of the adjustment of the partitions 39 the partitions 48 will be permitted to slide therewith. The partitions 48 are arranged in line with the partitions 17. Thus cakes sliding from the primary chute to the secondary chute will follow in the same general line of progression.

Between each pair of the wings 46 is placed a partition 51, which has no adjustment either lengthwise or sidewise and extends the full length of said partitions 39, wings 46, and partitions 48, their upper ends terminating in line with certain of the partitions 17. It is to be noted that the partitions 51 form one of the side walls of each of the spaces through which the cakes slide when passing down the secondary chute.

Immediately below the end of the secondary chute is arranged the inner end of the table 52, the outer end of which is supported by the legs 53, and the upper surface of this table is divided into longitudinal spaces or grooves by the stationary partitions 54 and the adjustable partitions 55, the former of which are supported upon the rods 56 and 57 by means of the collars 58, and the last-named partitions are also supported upon these rods by the nuts 59, which engage with right and left handed threads formed upon said rods in such manner as to cause these partitions to be moved to or from each other by the proper manipulation of said rods through the handles 60 and 61, the object of which is to vary the width of the spaces 62 to correspond with the spaces upon the secondary chute, in which are located the platforms 38, and in order that cakes may pass from the first-named to the last-named spaces without obstruction the partitions 55 are offset at their inner ends, as indicated at 63, and overlap the partitions 39 upon the opposite sides of the spaces 62, and when these partitions are thus matched it will be obvious that no obstruction is offered to the free movement of the cakes.

64 are slides, one arranged immediately beneath the platforms 38 and supported by the table 52 in such manner as to have no movement except that imparted thereto from the platforms in their longitudinal movement with the frame 20, and in order that such a movement may be imparted to the slides a pin 65 projects upward from each one thereof within a slot 66, formed in the platform, and this slot is of a length somewhat less than the longitudinal movement of the platforms for the purpose hereinafter set forth.

From the mechanism thus far described the operations of our improved machine will be obviously as follows:

The machine having been put in motion by power being applied to the drive-pulley 67, secured upon the main shaft, and cakes placed within the hopper upon the board 11, as clearly shown in Fig. 3, the lags upon the upper side of the belt 9 will engage with a number of said cakes and serve as elevators to carry the same to the upper surface of the primary chute 16, from whence they will slide downward onto the secondary chute and by further progressive movement pass on to the platforms 38, and as the spaces upon the secondary chute have been previously adjusted so as to permit but a single cake to slide therethrough at a time the cakes will be fed to the platform one after another.

After a number of cakes have been fed to the machine and they have passed into the grooves 62 those nearest the platforms will assume an upright position, as clearly shown in Fig. 3, and serve as obstructions to prevent the cakes upon the platforms from being pushed thereoff by those following down the incline of the secondary chute when the frame 20 is in the position shown in this figure. Now as the frame 20 moves backward, as before described, carrying therewith the platforms, the slides 64 will not at first be affected by this reverse movement of the platforms on account of the length of the slots in which the pins 65 project, so that as the outer ends of the platforms recede from the stack of cakes the outer edges of the slides will serve to hold said cakes against a retrograde movement until the outer walls of the slots come in contact with the pins, thereby causing the slides to move with the platforms, prior to which the cake which has been held upon each of the platforms will be permitted to slide thereoff and caused to do so by the pressure of the cakes in the rear thereof, and when it falls will assume the position indicated at A in Fig. 4, where it will be seen that its lower edge rests upon the slide. When the forward movement of the frame takes place, the platforms will be first carried forward without effecting a forward movement of the slides, as before described, and they will thereby push the cakes, which are in the positions indicated at A, forward until the outer edges of the platforms and slides are in vertical alinement, when these cakes will drop to the surface of the table and both the slides and the platforms will then continue to push them forward, as shown in Fig. 7, until the several parts of the machine again reach the positions shown in Fig. 3, thereby stacking the cakes closely together, as seen therein. It is obvious that a continuation of these operations will force the stacked cakes forward through the grooves 62 until they reach the end thereof, from whence they are removed by the attendants and placed within the boxes or other suitable receptacles.

To facilitate the progressive movement of the cakes after being precipitated upon the primary chute 16, this chute is given a crosswise vibratory movement by means of the link 68, which is pivoted at 69 to the frame 70, which supports said chute, and is connected at its opposite end to the crank-pin 71, carried by the upper end of the shaft 72, supported in suitable bearings 73, secured to the main frame of the machine. Upon the lower end of this shaft is secured a beveled pinion 74, which meshes with a like pinion 75, secured upon the main shaft 37, by means of which the shaft 72 is caused to revolve, it being understood that the frame 70 is supported upon guideways 76 in order that it may be permitted to reciprocate crosswise.

77 is a guard consisting of a straight edge supported by the sides of the primary chute, and its lower edge projects into such proximity to the surface of this chute as to prevent the passage of too great a number of cakes at one time.

In practice it is found that when square or irregular-shaped cakes are being fed to the secondary chute they are liable to become clogged in passing to the longitudinal spaces thereon by entering said spaces diagonally or with their greatest length crosswise thereof, and to overcome this difficulty we place the circular brushes 78 upon either side of the partitions 51 by securing them upon the shaft 79, which is journaled in suitable bearings projecting upward from the secondary chute, and rotary motion is imparted to this shaft by a sprocket-wheel 80, secured thereon, over which runs a sprocket-chain 81, running also over the sprocket-wheel 82, which is secured upon the shaft 83, the latter being journaled in bearings 84, projecting upward from the frame 20. Upon the last-named shaft is secured a sprocket-wheel 85, connected by the chains 86 to the sprocket-wheel 87, secured upon the main shaft 37, and in order that the longitudinal reciprocation of the frame 20 may not affect the transmission of motion from the main shaft to the shaft 83 a belt-tightener 88 is provided, carrying suitable rolls over which the chain 86 travels, and this tightener consists of a double arm secured to the rock-shaft 89, journaled in the hangers 90, and 91 are arms also secured to the rock-shaft 89 and depending therefrom and connected by links 92 to the bars 19, secured to the frame 20. By this arrangement as the frame 20 moves to and fro a swinging movement will be transmitted through the links 92 to the arms 91, and from thence to the rock-shaft 89, finally causing the belt-tightener to take up a similar swinging movement, which, as will be readily understood, will hold the chain 86 taut by compensating for the movements of the frame 20.

The brushes 78 rotate in the direction of the arrows adjacent thereto, so that their under sides tend to thrust the cakes up the incline of the secondary chute, in order that when said cakes come in contact with the brushes, with their projecting corners lying crosswise of the chute, these corners will be struck by the brushes, causing the cakes to assume a position which will present their nearest cross-section to the passages into which they are to slide.

The inner end of the table 52 is made adjustable vertically by the sweep-cams 94, secured upon the rod 95, journaled in the bearings 96, and this rod is provided with a hand-lever 97, by which it may be swung upon its axis, and 98 is a stud which projects from said lever through a slot formed in the link 99, and a suitable nut run upon the end of said stud serves to bind the lever in any position, so as to hold the sweep-cams in their adjustment. These cams bear upon the under surface of suitable strips secured to the under side of the table, so that by operating the lever this end of the table may be raised or lowered, as occasion requires.

While the belt 9 and lags carried thereby would perform their intended function were they given a uniform movement, we prefer to move said belt intermittently step by step, and this is accomplished by securing a ratchet-wheel 100 upon the shaft 3 and pivoting upon said shaft the slotted arm 101, to which are pivoted spring-actuated pawls 102, adapted to engage with the teeth of said ratchet when said arm is swung to and fro, as hereinafter described.

103 is a shoe fitted to slide within the groove in the arm 101 and having pivoted thereto the connecting-rod 104, the opposite end of which is pivoted at 35 to the crank-wheel 36, secured upon the main shaft. Thus when the machine is put in motion a to-and-fro swinging movement is imparted to said arm from this crank-wheel, which, by means of the pawl and ratchet, will impart an intermittent step-by-step movement to the shaft 3, which in turn will be transmitted to the belt 9 through the roll 4. Thus the cakes which have been placed within the hopper upon the board 11 will be fed in harmony with the push-out mechanism before described, and should this feeding become too rapid or too slow it may be altered to suit the requirements of the work in hand by adjusting the position of the shoe 103 upon the arm 101 by the proper manipulation of the threaded rod 105, which passes through the shoe and is provided with an operating-handle 106.

We are aware that alterations might be made in the design here shown, and we therefore do not wish to be limited to this exact construction, as our invention rests in the broad idea of automatically feeding and stacking cakes of all shapes and sizes, so that they may be readily transferred to boxes or other suitable receptacles.

Having thus fully described our invention, what we claim as new and useful is—

1. In a machine for stacking cakes and the like, a frame for supporting the operating parts of said machine, an endless belt for elevating said cakes from a suitable hopper, a primary chute upon which said cakes are precipitated from the belt, a secondary chute arranged to receive the cakes from the primary chute, platforms carried by said secondary chute, means for giving the secondary chute a to-and-fro longitudinal movement, and a table whose surface is divided by lengthwise partitions, substantially as and for the purposes set forth.

2. In a machine for stacking cakes and the like, a frame for supporting the operating parts thereof, an endless belt, lags secured upon said belt, a hopper having a hinged bottom, by means of which the cakes are fed to the machine, a primary chute arranged to receive the cakes from the lags of the belt, a secondary chute adapted to receive the cakes from the primary chute, adjustable partitions carried by said secondary chute for assorting and conveying the cakes to the proper locations, platforms 38 carried by the secondary chute, a table 52 adapted to receive the cakes from the platforms, a series of slides arranged beneath said platforms and adapted to receive their motion therefrom, mechanism for imparting a reciprocating motion to the secondary chute, and a main shaft for communicating motion to the operative parts of the machine, substantially as and for the purposes set forth.

3. In a machine of the character described, a frame for the support of the several operating parts thereof, a roll 4 suitably mounted, a roll 8 adjustably mounted upon said frame, an endless belt carried by said rolls, lags secured upon said belt, a board 11 so hinged as to be operated upon by said lags, mechanism for effecting an intermittent step-by-step movement of the roll 4, a primary chute mounted upon the frame of the machine so as to have a sidewise reciprocation, means for effecting said reciprocation, partitions 17, by which the upper surface of said chute is divided into ways, a secondary chute so mounted as to have a longitudinal to-and-fro movement, mechanism for effecting said to-and-fro movement, adjustable partitions arranged upon the secondary chute so as to guide the cakes in their downward movement, platforms 38 carried by said chute for receiving the cakes, slides 64 arranged beneath the platforms and adapted to receive motion therefrom, a table 52, a series of partitions 54 and 55, by which the upper surface of said table is divided into grooves, the partitions 55 being adjustable sidewise, and threaded rods, by means of which said partitions may be adjusted, substantially as and for the purposes set forth.

4. The herein-described combination of a frame for the support of the several parts of the machine, a shaft 3 journaled therein, a roll 4 mounted upon said shaft, a roll 8 mounted upon the shaft 7, adjustable boxes in which said shaft is journaled, means for adjusting said boxes, an endless belt carried by said rolls, lags 10 secured upon said belt, a board 11 so hinged that its inner edge is in the path of travel of said lags, a ratchet-and-pawl mechanism secured to the shaft 3, by means of which the latter is given an intermittent step-by-step movement, means for regulating the amount of said movement, a primary chute adapted to receive the cakes from the belt, partitions 17 for dividing said chute into ways, a straight edge 77 for regulating the passage of the cakes down the chute, a secondary chute adapted to receive the cakes from the primary chute, partitions 51 secured upon said secondary chute, adjustable partitions 48 also secured upon said chute, wings 46 pivoted to said adjustable partitions, partitions 39 to which said wings are also pivoted, rods 42 and 44, the former having right and left handed threads thereon, nuts 41 for engagement with said threads, collars 40 supported by the rod 44, said collars and nuts serving to support the partitions 39, a frame 20 upon which the secondary chute is supported, said frame being supported by ball-bearings, a rock-shaft 26, arms 25 carried thereby, connecting-links 28, the ends of which are pivoted to said frame and arms, platforms 38 carried by the lower end of the secondary chute, slides 64 having pins projecting upward therefrom into engagement with suitable slots formed in the platforms, and a table suitably divided for the reception of the cakes after being stacked, substantially as and for the purposes set forth.

5. In combination with a machine of the character described, a chute 18 so mounted as to have a longitudinal to-and-fro movement, mechanism for imparting said to-and-fro movement thereto, adjustable partitions arranged upon the upper surface of said chute, means for adjusting said partitions, platforms carried by the lower end of said chute, slides arranged beneath said platforms, pins projecting upward therefrom into engagement with suitable slots formed in said platforms, and a series of brushes rotatably mounted above the surface of the chute, whereby cakes sliding down said chute are brought into proper relative position to the guideways thereon, substantially as shown and described.

6. In a device of the character described a chute, stationary partitions secured therein, a bar across the chute, pairs of partitions slidable on the rod between the stationary partitions, a threaded rod journaled across the chute, nuts on the slidable partitions threaded to the rod, wings hinged to the ends of the slidable partitions, the wings of each pair being hinged together and extensions hinged to the joint of each pair of wings and slidably guided in slots of the chute as and for the purpose described.

7. In combination with the secondary chute of a machine of the character described, platforms carried by the lower end of said chute having slots formed therein, slides arranged beneath said platforms and pins projecting upward from said slides within said slots, said slots being so arranged as to cause the slides to dwell during a portion of the movement of the chute, substantially as and for the purpose set forth.

8. In a device of the character described a frame, a chute reciprocating thereon, a rotary brush carried on said chute and means for imparting motion to said brush consisting of a sprocket-wheel on the chute geared to the brush, a suitably-driven sprocket-wheel journaled in the frame a sprocket-chain connecting said sprocket-wheels and a belt-tightener composed of an arm hinged to the frame and carrying two pulleys which support the two stretchers of the chain, and a lever secured to the arm and operated by the chute through a connecting-rod as and for the purpose described.

9. In a device of the character described, a frame, a chute slidable thereon, a rock-shaft journaled in the frame carrying an arm, a link connecting the arm to the chute, a lever on the rock-shaft having a slot, a shoe sliding in the slot, a screw operating through the shoe, adapted to determine the position of the shoe within the slot, a power-shaft journaled in the frame carrying a crank-wheel and a connecting-rod connecting the crank-wheel to the shoe as and for the purpose described.

In testimony whereof we have hereunto affixed our signatures in the presence of two subscribing witnesses.

DANIEL MAURICE HARTMAN.
JOHN G. DONNELL.

Witnesses:
S. S. WILLIAMSON,
MARK BUFORD.